United States Patent
Chang et al.

[11] Patent Number: 6,104,838
[45] Date of Patent: Aug. 15, 2000

[54] 1/16 SIZE REAL TIME DECODING OF DIGITAL VIDEO

[75] Inventors: Ching-Fang Chang, San Jose, Calif.; Naofumi Yanagihara, Tokyo, Japan

[73] Assignees: Sony Corporation, Tokyo, Japan; Sony Electronics, Inc., Park Ridge, N.J.

[21] Appl. No.: 08/970,338

[22] Filed: Nov. 14, 1997

[51] Int. Cl.$^7$ ............................... G06K 9/36; H04N 7/12
[52] U.S. Cl. .................... 382/250; 348/403; 348/408
[58] Field of Search ............................ 382/233, 250; 348/403, 420, 408; 358/435, 427, 432; 386/124, 40

[56] References Cited

U.S. PATENT DOCUMENTS

| | | | |
|---|---|---|---|
| 5,870,144 | 2/1999 | Guerrara | 348/403 |
| 5,957,998 | 9/1999 | Ozaki | 382/250 |

OTHER PUBLICATIONS

Gonzalez, R.C. et al. "Digital Image Processing," Addison-Wesley, Reading, MA (1977) pp. 102–103.

"Specifications of Consumer-Used Digital VCRs using 6.3 mm Magnetic Tape", HD Digital VCR conference, (Dec. 1994).

*Primary Examiner*—Thomas D Lee
*Assistant Examiner*—Wen Peng Chen
*Attorney, Agent, or Firm*—Blakely, Sokoloff, Taylor & Zafman LLP

[57] ABSTRACT

A system and method to decode encoded video images in such a manner as to maintain high quality images while reducing the computation time needed to decode the images. The system takes into account that the resultant display generated may only have a fraction (1/16) of the resolution of the original image. Thus, optimizations are realized by modifying the inverse discrete cosine transform (IDCT) and inverse weighting (IW) processes to process only the portion of the image to be displayed.

32 Claims, 9 Drawing Sheets

$$P(x,y) = \frac{1}{4} \sum_{v=0}^{1} \underbrace{\left\{ \frac{C'(v)}{w(v)} \cos \frac{\pi v(2y+1)}{4} \underbrace{\left[ \sum_{h=0}^{1} \left( \frac{C'(h)}{w(h)} \cos\left(\frac{\pi h(2x+1)}{4}\right) Q''(h,v) \right) \right]}_{806} \right\}}_{807}$$

805

$$P(x,y) = \frac{1}{4} \sum_{h=0}^{1} \underbrace{\left\{ \frac{C'(h)}{w(h)} \cos \frac{\pi h(2x+1)}{4} \underbrace{\left[ \sum_{v=0}^{1} \left( \frac{C'(v)}{w(v)} \cos\left(\frac{\pi v(2y+1)}{4}\right) Q''(h,v) \right) \right]}_{811} \right\}}_{812}$$

810

WHERE  $x = 0,1$
$y = 0,1$ $C'(h) = \begin{cases} 1, & h=0 \\ \sqrt{2}, & h=1 \end{cases}$ $Q''(h,v) = \begin{cases} 2Q(h,v), & h=0, v=0 \\ Q(h,v), & \text{others} \end{cases}$ $w(0) = 1$
$w(1) = CS4/(4 * CS7 * CS2)$
$CSm = \cos(m\pi/16)$

815

Fig. 8a $$P(x,y) = \frac{1}{4} \sum_{v=0}^{1} \left\{ \frac{C'(v)}{w(2v)} \cos \frac{\pi v(2y+1)}{4} \left[ \sum_{h=0}^{1} \left( \frac{C'(h)}{w(h)} \cos\left(\frac{\pi h(2x+1)}{4}\right) Q''(h,v) \right) \right] \right\}$$

$$P(x,y) = \frac{1}{4} \sum_{h=0}^{1} \left\{ \frac{C'(h)}{w(h)} \cos \frac{\pi v(2x+1)}{4} \left[ \sum_{v=0}^{1} \left( \frac{C'(v)}{w(2v)} \cos\left(\frac{\pi v(2y+1)}{4}\right) Q''(h,v) \right) \right] \right\}$$

WHERE  $x = 0, 1$
$y = 0, 1$ $C'(h) = \begin{cases} 1, & h = 0 \\ \sqrt{2}, & h = 1 \end{cases}$ $Q''(h,v) = \begin{cases} 2Q(h,v), & h = 0, v = 0 \\ Q(h,v), & \text{others} \end{cases}$ $w(0) = 1$
$w(1) = CS4/(4 * CS7 * CS2)$
$w(2) = CS4/(2 * CS6)$
$CSm = \cos(m\pi/16)$

Fig. 8b

1/16 SIZE REAL TIME DECODING OF DIGITAL VIDEO

BACKGROUND OF THE INVENTION

1. Field of the Invention

The present invention relates to the decoding of digital video images.

2. Art Background

Video images in digital format, referred to frequently as digital video (DV) is achieving greater usage as the use of computers for developing video images increases. The digital video data is stored or transmitted in a compressed encoded format, often referred to as "DV" format. The encoding process typically includes a discrete cosine transform (DCT) to translate the pixel data into DCT coefficients and a weighting function to weight the values (See e.g., "Specifications of Consumer-Used Digital VCRs Using 6.3 mm Magnetic Tape", HD Digital VCR Conference, (December 1994)). After the data is decoded, the image is sized for the viewing window, for example, by using a pixel decimation process wherein specified spatially spaced pixels are removed to reduce the number of pixels representative of the image. Thus, a number of pixels decoded are not subsequently displayed.

The decoding process is time consuming due to the number of operations required to decode the data. Thus it is desirable to minimize the time required to perform the decoding process while maintaining a high quality image.

SUMMARY OF THE INVENTION

The system and method of the present invention decodes encoded video images in such a manner as to maintain high quality images while reducing the computation time needed to decode the images. The system takes into account that the resultant display generated may only have a fraction of the resolution of the original image. Thus, optimizations are realized by modifying and combining the inverse discrete cosine transform (IDCT) and inverse weighting (IW) processes to process only the portion of the image to be displayed.

In one embodiment of a decoding of a 1/16 size image, a horizontal 2-point IW/IDCT process is applied to the lower two coefficients in each of the first two rows of an 8×8 matrix of transformed coefficients, referred to herein as a block, which is part of a frame of video. A vertical 2-point IW/IDCT process is applied to the lower two coefficients in each of the first two columns. The result is a 2×2 matrix of pixel data.

In an alternate embodiment, when the input block consists of two 4×8 matrices of sum and difference coefficients, a horizontal 2-point IW/IDCT is applied to the lower two coefficients. A vertical 2-point IW/IDCT is applied to the lower two sum coefficients.

BRIEF DESCRIPTION OF THE DRAWINGS

The objects, features and advantages of the present invention will be apparent from the following detailed description in which:

FIG. 8a and FIG. 8b illustrate two dimensional implementations of the flow diagrams of FIG. 2 and FIG. 5, respectively.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention unnecessarily.

Figure 1A:
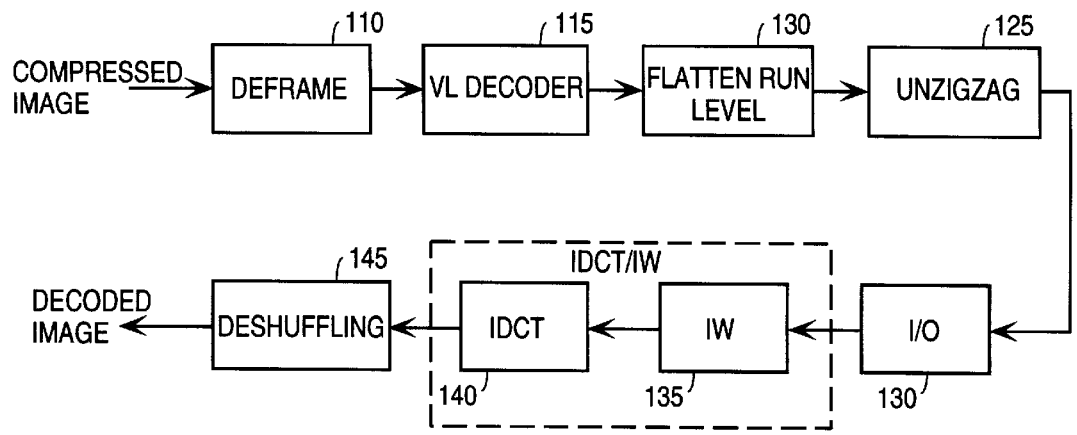
FIG. 1a is a simplified block diagram of one embodiment of a decoder which operates in accordance with the teachings of the present invention.

FIG. 1a illustrates, in simplified block diagram form, one implementation of the decoding circuitry of the present invention. It is readily apparent that the present invention can be implemented in a dedicated microcontroller circuit in logic circuitry or software operable on a general purpose computer. The applications of such decoders are varied. For example, the decoder may be implemented in a computer system that receives digital video signals from an external source such as satellite, broadcasts or digital video players. Alternately, the decoder circuitry may be embodied in digital video player recorders, cameras or other digital video equipment.

Referring to FIG. 1a, the compressed image is input to a deframing subcircuit 110, which unpacks every five fixed-length synchronization blocks into thirty blocks of variable-length coded quantized coefficients. A block is a portion of a frame of video image. In the present embodiment, each encoded block is a matrix of 8×8 discrete cosine transform (DCT) coefficients. In an alternate embodiment, each block consists of two matrices of 4×8 DCT coefficients, one matrix containing sum coefficients and one matrix containing difference coefficients. VL decoder 115 performs a variable length decoding process in accordance with teachings known in the art to generate run-level pairs of DCT coefficients. The flatten run-level circuit 120 expands the run-level pairs into individual DCT coefficients. For example, if a run-level pair sequence consists of (2,2), (4,1), the flattened representation consists of (0,0,2), (0,0,0,0,1). The unzig-zag subcircuit 125 receives the one-dimensional representation of the quantized coefficients and turns it into a two-dimensional representation. The I/Q subcircuit performs an inverse quantization process on the DCT coefficients. The inverse weighting (IW) function 135 inversely weights the coefficients that originally were weighted during the encoding process. One example of the weighting performed is described in "Specifications of Consumer-Used Digital VCRs Using 6.3 mm Magnetic Tape", HD Digital VCR Conference, (December 1994), page 28.

An inverse discrete cosine transform (IDCT) 140 is then applied to transform the DCT coefficients into pixel values. Once the pixel values are generated, a deshuffling process 145 is applied to generate the completed image. The subcircuits 110, 115, 120, 125, 130 and 145 may be embodied a variety of ways known to one skilled in the art and will not be discussed further herein. For further information see, for example, "Specifications of Consumer-Used Digital VCRs Using 6.3 mm Magnetic Tape", HD Digital VCR Conference, (December 1994).

Figure 1B:
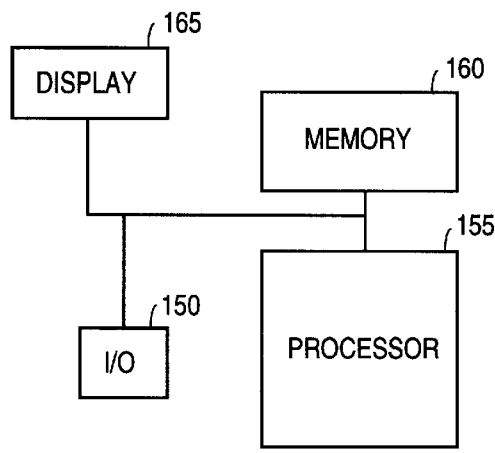
FIG. 1b is a simplified block diagram of a general purpose computer that operates in accordance with the teachings of the present invention.

As will be explained below, an innovative combination of inverse weighting (IW) and inverse discrete cosine transform implementation has been developed to provide high quality reduced-sized images with minimal processing overhead. As noted earlier, the present invention also may be implemented on a general purpose computer as illustrated in FIG. 1b.

In this embodiment, the compressed image is received through input port circuitry 150 which forwards the data to the processor 155 which executes instructions from memory 160 to perform the steps described, and in some embodiments, display the decoded image on display 165.

Figure 2:
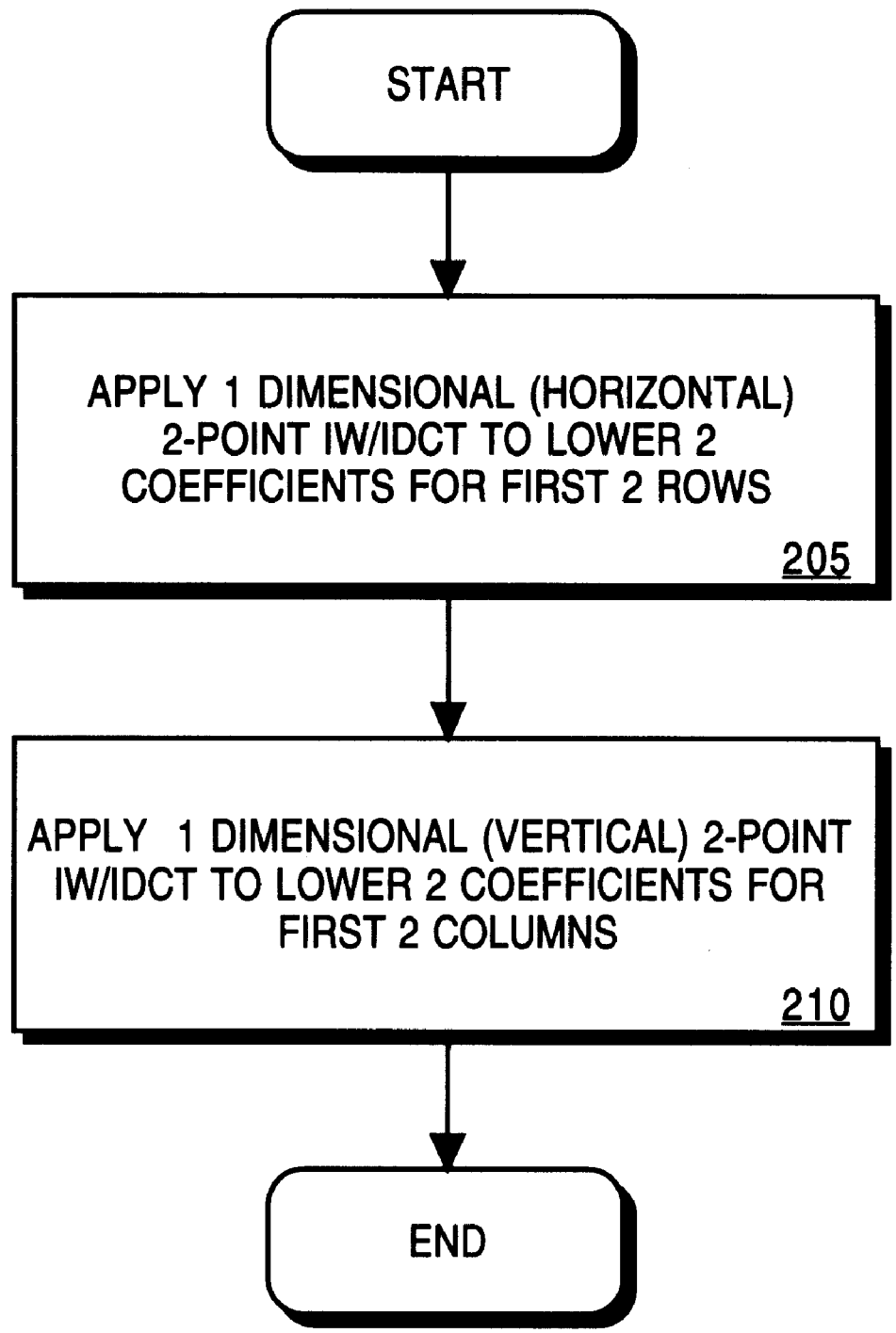
FIG. 2 is a flow diagram illustrating one embodiment of the method of the present invention to perform a combined inverse cosine transform and inverse weighting function on an 8×8 block of coefficients.

FIG. 2 is a simplified flow diagram of one embodiment of the innovative process for decoding a ⅟16 size image in accordance with the teachings of the present invention. The embodiments described herein combine the application of inverse weighting (IW) and inverse discrete cosine transform (IDCT) into one function. The advantage to this is that the number of multiplications or computations required is reduced. However, it should be realized that the IW and IDCT processes described herein can be applied in a serial manner.

One embodiment of the process as applied to an 8×8 block is illustrated in FIG. 2. It should be noted that the present embodiment describes the process with respect to an 8×8 block; however it is contemplated that the process may be applied to m×n blocks, where m is greater than or equal to 2 and n is greater than or equal to 2.

Referring to FIG. 2, at step 205, a one-dimensional two-point IW/IDCT is applied to the lower two coefficients in the horizontal orientation.

Figure 3:
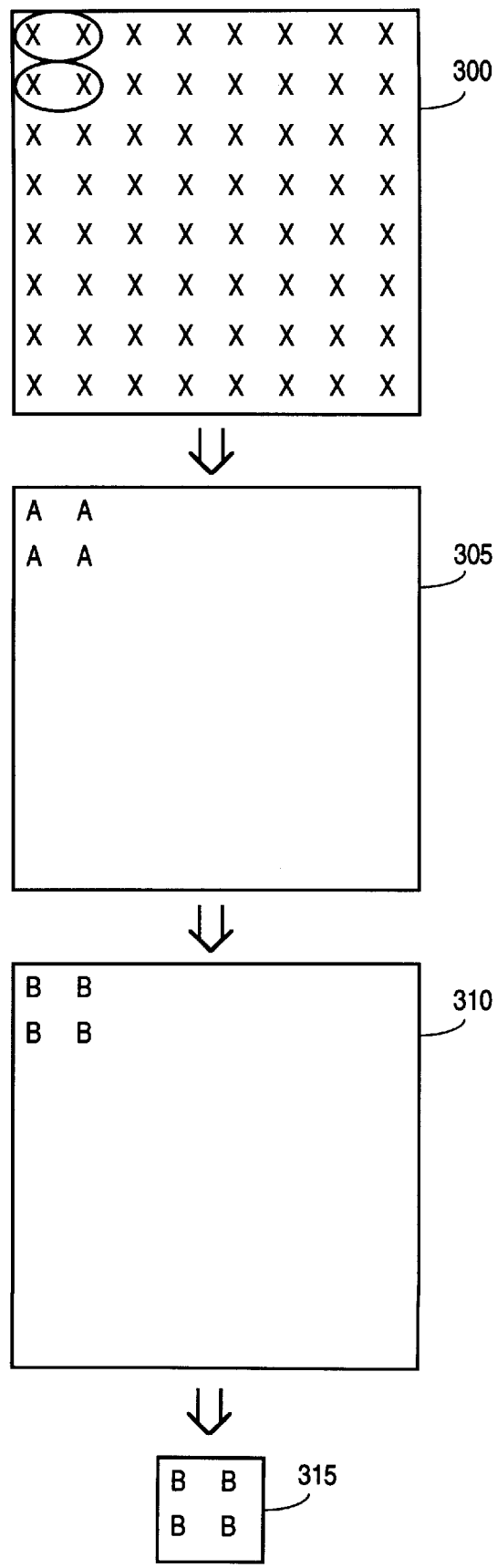
FIG. 3 is a diagram illustrating the coefficients processed in accordance with the flow diagram of FIG. 2.

Referring to FIG. 3, block 300 is representative of an exemplary 8×8 block of DCT coefficients. The index of block 300 increases from left to right and from top to bottom. The coefficients with smaller indices are referred to as lower coefficients. The coefficients with larger indices are referred to as higher coefficients. Block 305 is representative of the coefficients ("A") of the block after application of the 2-point IW/IDCT represented by step 205. It should be noted that the coefficients not shown were not processed by the IW/IDCT of step 205; therefore, it is preferred that for subsequent operations these coefficients are ignored and not processed to save on processing time. For purposes of simplicity, the unprocessed coefficients are removed from FIG. 3.

Referring back to FIG. 2 at step 210, a vertical 2-point IW/IDCT is applied to the lower two coefficients. In FIG. 3 at block 310, the resultant pixel data ("B") generated from this operation is shown. Block 315 is representative of the image portion that is generated. It should be noted that the sequence of operations performed are interchangeable wherein step 210 can be performed before step 205.

Figure 4:
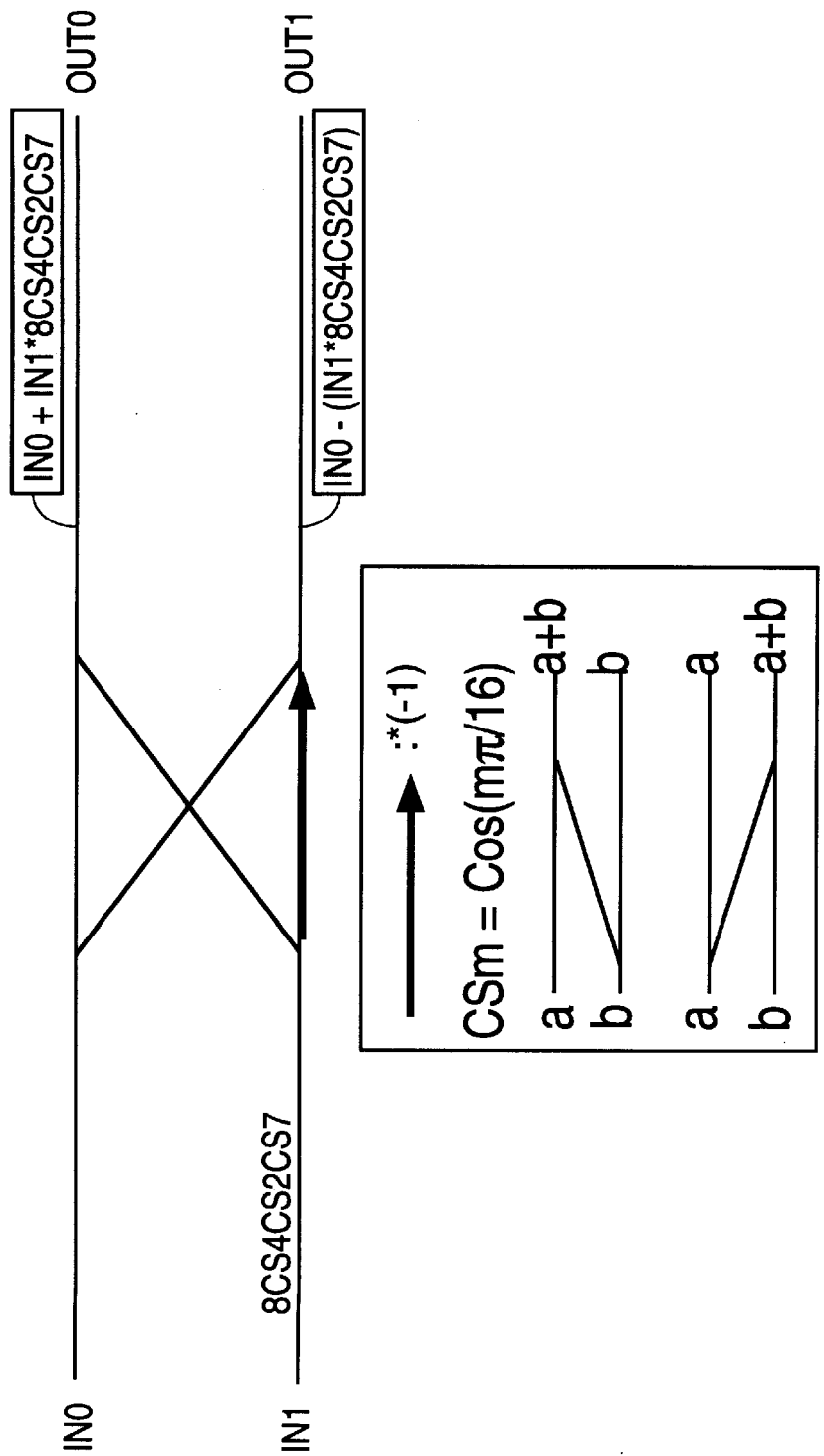
FIG. 4 is a butterfly diagram illustrating one embodiment of the combined one-dimensional 2-point inverse cosine transforms and inverse weighting function utilized in accordance with the flow diagram of FIG. 2.

One embodiment of the 2-point IW/IDCT utilized is described by the butterfly diagram of FIG. 4. This diagrammatic representation is known to one skilled in the art and will not be explained in detail herein. However, the diagonal lines represent addition operations and the arrows represent a multiplication by a value of −1. Furthermore, the values along the line of input, e.g., 8*CS4*CS2*CS7, where CSm=cos(mπ/16), represents a multiplication of the value, e.g., IN1, by that value shown. In addition, CSm=cos(mπ/16); thus, for example, OUT0=IN0+IN1*8CS4*CS2*CS7, where CSm=cos(mπ/16). OUT1 similarly results in IN0−IN1*8*CS4*CS2*CS7. It should be noted that the diagram can be represented a variety of ways to convey the end computation performed. In addition, the computations can be scaled. For example, the inputs can be scaled by a common factor or the outputs can be scaled. In addition, the values can be scaled along the computation line in between the input and the output, for example at some common computation stage, so long as the scaling is consistently applied to maintain the relationships among the outputs.

In an alternate embodiment, the coefficients are represented by two 4×8 matrices of sum and difference coefficients, wherein the first array contains sum coefficients and the second array contains the difference coefficients. The use of 4×8 blocks is defined in "Specifications of Consumer-Used Digital VCRs Using 6.3 mm Magnetic Tape", HD Digital VCR Conference, (December 1994), page 27 and page 84. It is further contemplated that blocks of m×n dimensions may be used, where m is greater than or equal to 2 and n is greater than or equal to 2.

The process for decoding a ⅟16 image encoded in this format is described with reference to FIG. 5. At step 505 a one-dimensional horizontal 2-point IW/IDCT is applied.

Figure 5:
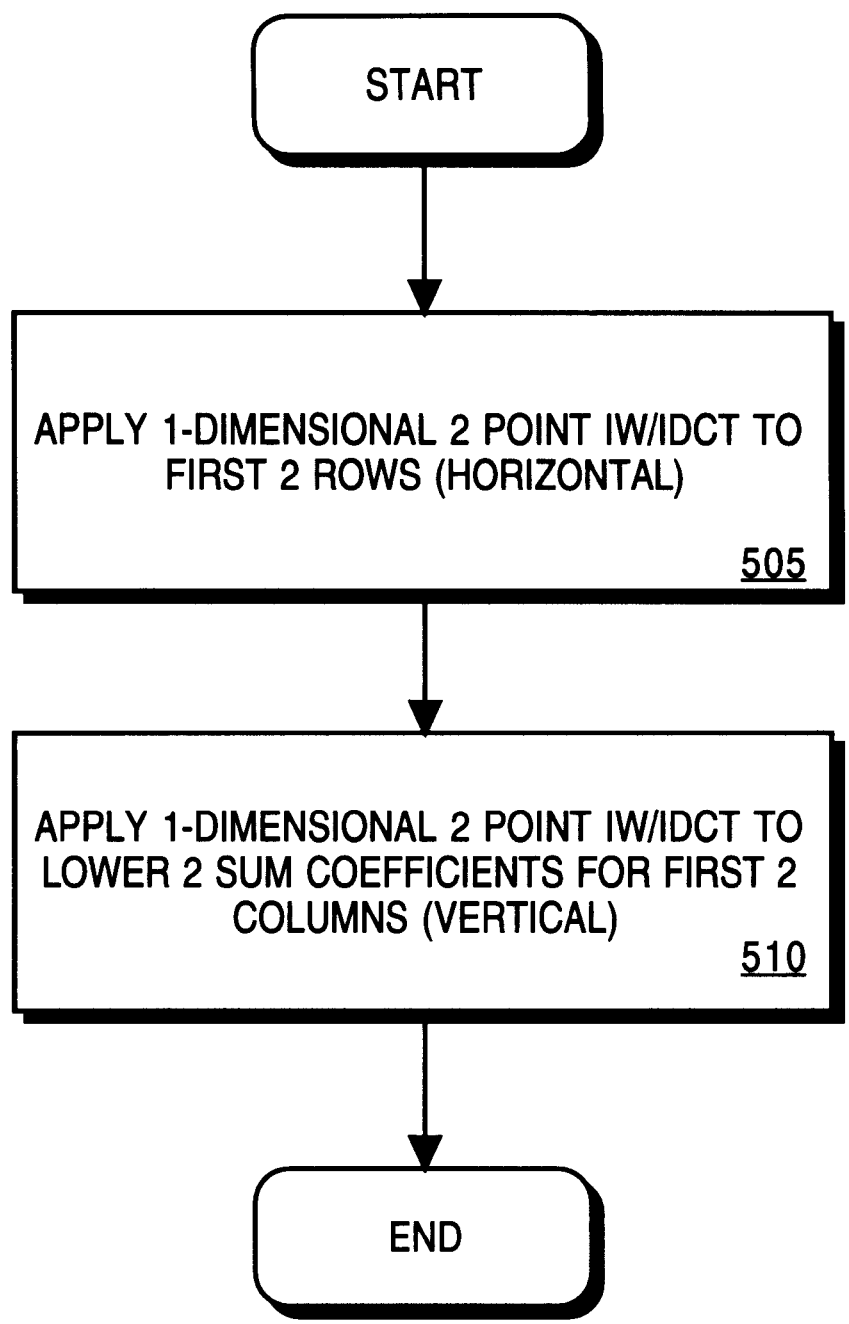
FIG. 5 is a flow diagram illustrating an alternate embodiment of of the method the present invention that performs a combined inverse cosine transform and inverse weighting function on two 4×8 matrices of sum and difference coefficients.
Figure 6:
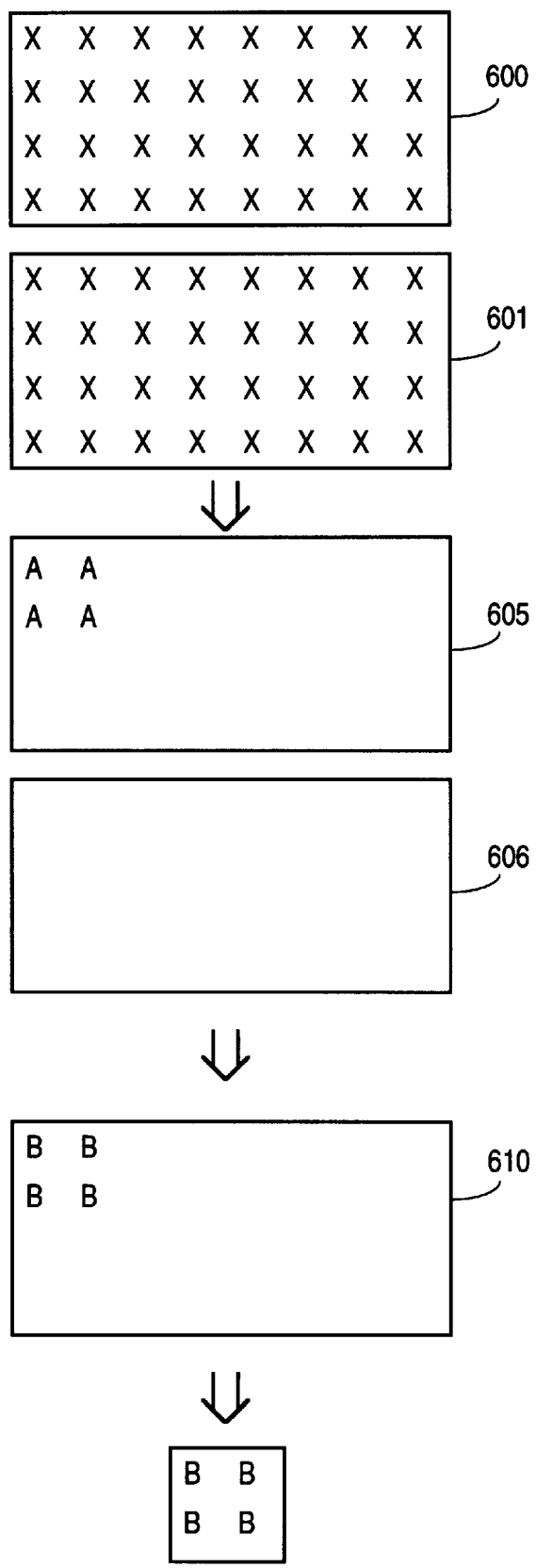
FIG. 6 is a diagram illustrating the coefficients processed in accordance with the flow diagram of FIG. 5.

FIG. 6, blocks 600, 601 illustrate the encoded sum and difference coefficients in two 4×8 arrays. Blocks 605 and 606 represent the arrays with the "A" coefficients after the application of the one-dimensional 2-point IW/IDCT in the horizontal direction. Continuing with the process, at step 510 in FIG. 5, a one-dimensional vertical 2-point IW/IDCT is applied to the lower two sum coefficients in the vertical direction. Block 610 shows the pixel data ("B") after the one-dimensional 2-point IW/IDCT is applied in the vertical direction. The 4 pixel data is a portion of the image that may subsequently be used to render a video image on a display. It should be noted that the steps 505 and 510 are interchangeable wherein step 510 can be performed before step 505.

Figure 7:
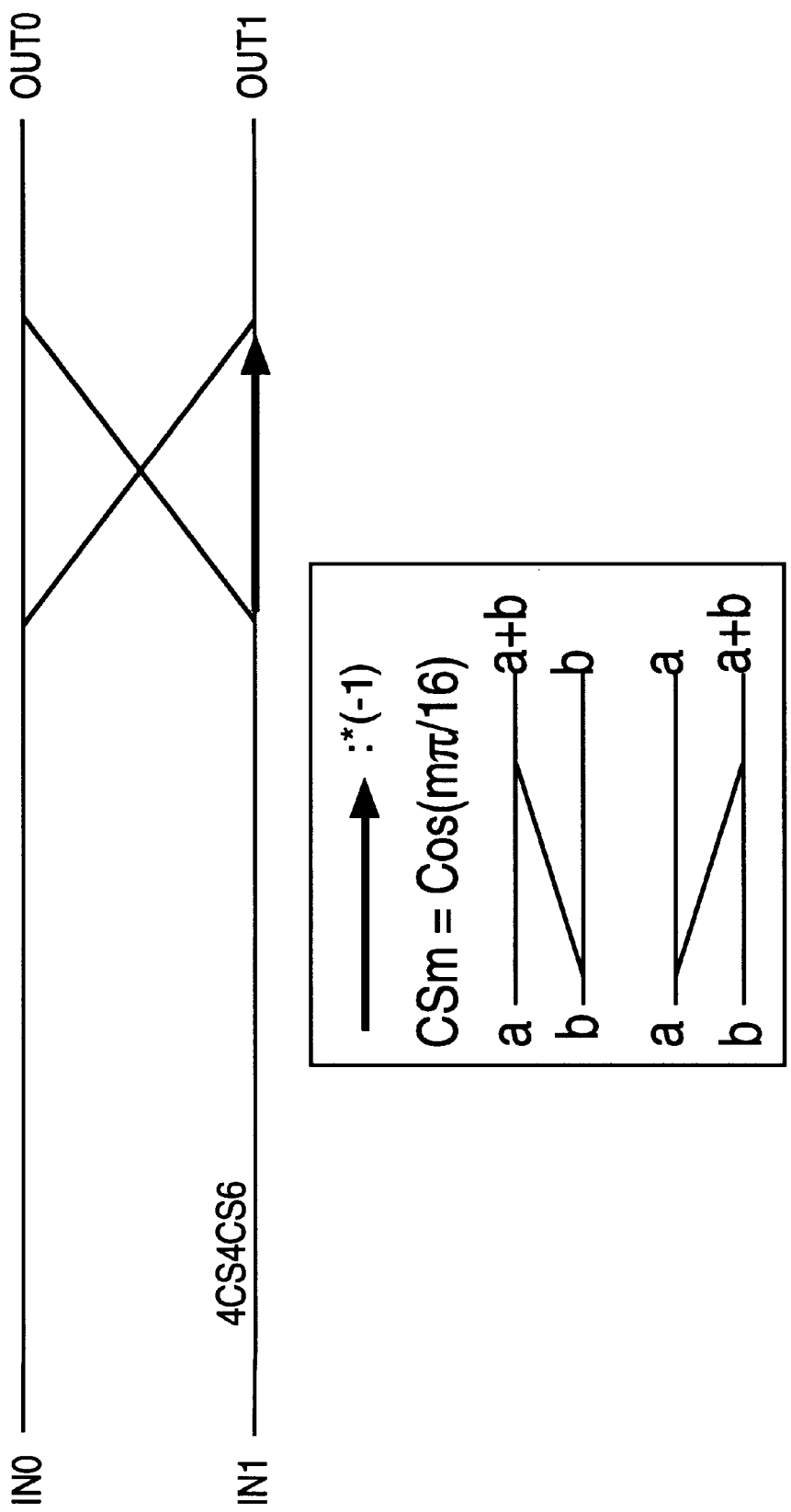
FIG. 7 is a butterfly diagram illustrating one embodiment of a vertical inverse discrete cosine transform and inverse weighting function utilized in accordance with the flow diagram of FIG. 5.

One embodiment of the 2-point IW/IDCT applied at step 505 is represented by the butterfly diagram of FIG. 4. One example of the 2-point IW/IDCT applied at step 510 is represented by the butterfly diagram of FIG. 7. As noted earlier, the butterfly diagram can be configured a variety of ways to convey the end computation performed. In addition, the computations can be scaled so long as the scaling is consistently applied to maintain the relationships among the outputs.

The processes described in FIGS. 2 and 5 describe the embodiments which apply one dimensional IW/IDCT operations or processes. The IW/IDCT processes described in FIG. 2 through FIG. 7 can be represented by mathematical formulae in FIG. 8a and FIG. 8b. For example, the equation 805 illustrates the computation for each location (x,y) where p(x,y) is the pixel at that location and Q(h,v) is the weighted DCT coefficient at each location (h,v). The equation 805 is done in one order where the corresponding horizontal operation 806 is performed before the vertical operation 807.

Equation 810 forms a similar computation wherein the vertical operation 811 is performed before the horizontal operation 812. The values in block 815 depict the parameters used in equations 805 and 810. Similarly, FIG. 8b illustrates the two-dimensional implementation of the 1/16 size decoding for two 4×8 block representations. In equation 825 the horizontal operation 826 is performed before the vertical operation 827 and in equation 830 the vertical operation 831 is performed before the horizontal operation 832. Block 835 defines the parameters used in the equations 825 and 830.

The embodiments described implement one-dimensional IW/IDCTs (i.e., a horizontal IW/IDCT and a vertical IW/IDCT). However, it is contemplated that the IW/IDCTs can be applied two-dimensionally.

The invention has been described in conjunction with the preferred embodiment. It is evident that numerous alternatives, modifications, variations and uses will be apparent to those skilled in the art in light of the foregoing description.

What is claimed is:

1. A method for performing 1/16 size decoding of an encoded digital image comprising the steps of:

applying a combined horizontal 2-point inverse weighting function and inverse discrete cosine transform to a lower quarter of an input block of coefficients IN0, IN1 to produce a second block;

applying a combined vertical 2-point inverse weighting function and inverse discrete cosine transform to a lower quarter of the second block; and applying a horizontal 2-point inverse weighting function and inverse discrete cosine transform and applying a vertical 2-point inverse weighting function and inverse discrete cosine transform are performed according to the following equation:

$$P(x,y) = \frac{1}{4}\sum_{v=0}^{1}\left\{\frac{C'(v)}{w(v)}\cos\frac{\pi v(2y+1)}{4}\left[\sum_{h=0}^{1}\left(\frac{C'(h)}{w(h)}\cos\left(\frac{\pi h(2x+1)}{4}\right)\right)Q''(h,v)\right]\right\}$$

where P(x,y) represents the pixel value at location (x,y); C'(h)=1 when h=0 or √2 when h=1; Q"(h,v)=2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2); and CSm=cos(mπ/16).

2. The method as set forth in claim 1, wherein the input block comprises an m×n matrix, where m≧2 and n≧2 and the step of applying a horizontal 2-point inverse weighting function and inverse discrete cosine transform is applied to two rows of lower frequency coefficients.

3. The method as set forth in claim 1, wherein the input block comprises an m×n matrix, where m≧2 and n≧2 and the step of a vertical 2-point inverse weighting function and inverse discrete cosine transform is applied to two columns of lower frequency coefficients.

4. The method as set forth in claim 1, wherein the input block comprises two n×4 matrices of sum and difference coefficients.

5. The method as set forth in claim 4, wherein the steps of applying a horizontal 2-point inverse weighting function and inverse discrete cosine transform and applying a vertical 2-point inverse weighting function and inverse discrete cosine transform are performed according to the following equation:

$$P(x,y) = \frac{1}{4}\sum_{v=0}^{1}\left\{\frac{C'(v)}{w(2v)}\cos\frac{\pi v(2y+1)}{4}\left[\sum_{h=0}^{1}\left(\frac{C'(h)}{w(h)}\cos\left(\frac{\pi h(2x+1)}{4}\right)\right)Q''(h,v)\right]\right\}$$

where P(x,y) represents the pixel value at location (x,y); C'(h)=1 when h=0 or √2 when h=1; Q"(h,v)=2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2); w(2)=CS4/(2*CS6); and CSm=cos(mπ/16).

6. The method as set forth in claim 4, wherein the step of applying a horizontal 2-point combined inverse weighting function and inverse discrete cosine transform comprises applying the following function:

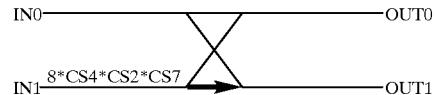

7. The method as set forth in claim 4, wherein the step of applying a vertical 2-point combined inverse weighting function and inverse discrete cosine transform comprises applying the following function:

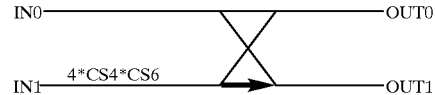

8. The method as set forth in claim 1, wherein the step of applying a horizontal and vertical 2-point combined inverse weighting function and inverse discrete cosine transform each comprises applying the following function:

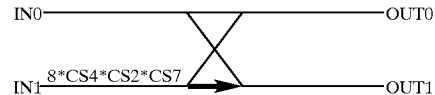

-continued

Where: 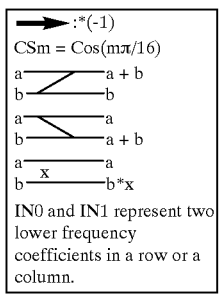

9. A method for performing 1/16 size decoding of an encoded digital image comprising the steps of:
applying a combined vertical 2-point inverse weighting function and inverse discrete cosine transform to a lower quarter of an input block of coefficients to produce a second block;
applying a combined horizontal 2-point inverse weighting function and inverse discrete cosine transform to a lower quarter of the second block; and
applying a horizontal to point inverse weighting function and inverse discrete cosine transform and applying a vertical 2-point inverse weighting function and inverse discrete cosine transform are performed according to the following equation:

$$P(x, y) = \frac{1}{4}\sum_{h=0}^{1}\left\{\frac{C'(h)}{w(h)}\cos\frac{\pi h(2x+1)}{4}\left[\sum_{v=0}^{1}\left(\frac{C'(v)}{w(v)}\cos\left(\frac{\pi v(2y+1)}{4}\right)\right)Q''(h,v)\right]\right\}$$

where P(x,y) represents the pixel value at location (x,y); C'(h)=1 when h=0 or √2 when h=1; Q"(h,v)=2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2); and CSm=cos(mπ/16).

10. The method as set forth in claim 9, wherein the input block is two 4×n matrices of sum and difference coefficients and the steps of applying a horizontal 2-point inverse weighting function and inverse discrete cosine transform and applying a vertical 2-point inverse weighting function and inverse discrete cosine transform are performed according to the following equation:

$$P(x, y) = \frac{1}{4}\sum_{h=0}^{1}\left\{\frac{C'(h)}{w(h)}\cos\frac{\pi v(2x+1)}{4}\left[\sum_{v=0}^{1}\left(\frac{C'(v)}{w(2v)}\cos\left(\frac{\pi v(2y+1)}{4}\right)\right)Q''(h,v)\right]\right\}$$

where P(x,y) represents the pixel value at location (x,y); C'(h)=1 when h=0 or √2 when h=1; Q"(h,v)=2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2); w(2)=CS4/(2*CS6); and CSm=cos(mπ/16).

11. A system for performing 1/16 size decoding of an encoded digital image comprising an inverse weighting subcircuit and inverse discrete cosine transform circuit, said circuits configured to perform a combined horizontal 2-point inverse weighting function and inverse discrete cosine transform to a lower quarter of an input block of coefficients IN0, IN1 to produce a second block, said circuits further configured to apply a combined vertical 2-point inverse weighting function and inverse discrete cosine transform to the second block to produce a block 1/16 size of input block; and wherein the horizontal 2-point inverse weighting function and inverse discrete cosine transform and vertical 2-point inverse weighting function and inverse discrete cosine transform comprise the following equation:

$$P(x, y) = \frac{1}{4}\sum_{v=0}^{1}\left\{\frac{C'(v)}{w(v)}\cos\frac{\pi v(2y+1)}{4}\left[\sum_{h=0}^{1}\left(\frac{C'(h)}{w(h)}\cos\left(\frac{\pi h(2x+1)}{4}\right)\right)Q''(h,v)\right]\right\}$$

where P(x,y) represents the pixel value at location (x,y); C'(h)=1 when h=0 or √2 when h=1; Q"(h,v)=2Q(h,v) when h=0, v=0, or Q(h,v) when h≠0 or v≠0, Q(h,v) represents the weighted DCT coefficient at each location (h,v); w(0)=1, w(1)=CS4/(4*CS7*CS2); and CSm=cos(mπ/16).

12. The system as set forth in claim 11, wherein the input block comprises an m×n matrix, where m≧2 and n≧2 and the horizontal 2-point inverse weighting function and inverse discrete cosine transform is applied to two rows of lower frequency coefficients.

13. The system as set forth in claim 11, wherein the input block comprises an m×n matrix, where m≧2 and n≧2 and the vertical 2-point inverse weighting function and inverse discrete cosine transform is applied two columns of lower frequency coefficients.

14. The system as set forth in claim 11, wherein the input block comprises two m×n matrices, wherein m≧2 and n≧2 of sum and difference coefficients.

15. The system as set forth in claim 14, wherein the horizontal 2-point inverse weighting function and inverse discrete cosine transform and vertical 2-point inverse weighting function and inverse discrete cosine transform are performed according to the following equation:

$$P(x, y) = \frac{1}{4}\sum_{v=0}^{1}\left\{\frac{C'(v)}{w(2v)}\cos\frac{\pi v(2y+1)}{4}\left[\sum_{h=0}^{1}\left(\frac{C'(h)}{w(h)}\cos\left(\frac{\pi h(2x+1)}{4}\right)\right)Q''(h,v)\right]\right\}$$

where P(x,y) represents the pixel value at location (x,y); C'(h)=1 when h=0 or √2 when h=1; Q"(h,v)=2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2); w(2)=CS4/(2*CS6); and CSm=cos(mπ/16).

16. The system as set forth in claim 14, wherein the horizontal 2-point combined inverse weighting function and inverse discrete cosine transform comprises the following function:

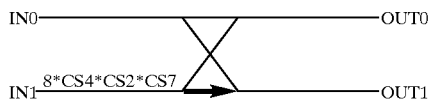

17. The system as set forth in claim 14, wherein the vertical 2-point combined inverse weighting function and inverse discrete cosine transform comprises the following function:

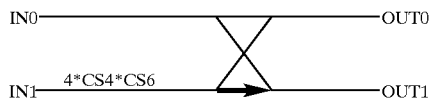

18. The system as set forth in claim 11, wherein the horizontal and vertical 2-point combined inverse weighting function and inverse discrete cosine transform each comprises the following function:

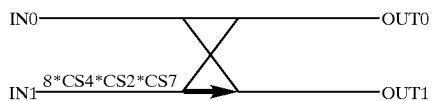

19. A system for performing 1/16 size decoding of an encoded digital image comprising an inverse weighting subcircuit and inverse discrete cosine transform circuit, said circuits configured to perform a combined vertical 2-point inverse weighting function and inverse discrete cosine transform to a lower quarter of an input block of coefficients to produce a second block, said circuits further configured to apply a combined horizontal 2-point inverse weighting function and inverse discrete cosine transform to the second block to produce a block 1/16 size of input block; and wherein the horizontal 2-point inverse weighting function and inverse discrete cosine transform, vertical 2-point inverse weighting function and inverse discrete cosine transform comprise the following equation:

$$P(x, y) = \frac{1}{4} \sum_{h=0}^{1} \left\{ \frac{C'(h)}{w(h)} \cos\frac{\pi h(2x+1)}{4} \left[ \sum_{v=0}^{1} \left( \frac{C'(v)}{w(v)} \cos\left(\frac{\pi v(2y+1)}{4}\right) \right) Q''(h, v) \right] \right\}$$

where P(x,y) represents the pixel value at location (x,y); C'(h)=1 when h=0 or √2 when h=1; Q"(h,v)=2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2); and CSm=cos(mπ/16).

20. The system as set forth in claim 9, wherein the input block is two 4×n matrices of sum and difference coefficients and the horizontal 2-point inverse weighting function and inverse discrete cosine transform and vertical 2-point inverse weighting function and inverse discrete cosine transform are performed according to the following equation:

$$P(x, y) = \frac{1}{4} \sum_{h=0}^{1} \left\{ \frac{C'(h)}{w(h)} \cos\frac{\pi v(2x+1)}{4} \left[ \sum_{v=0}^{1} \left( \frac{C'(v)}{w(2v)} \cos\left(\frac{\pi v(2y+1)}{4}\right) \right) Q''(h, v) \right] \right\}$$

where P(x,y) represents the pixel value at location (x,y); C'(h)=1 when h=0 or √2 when h=1; Q"(h,v)=2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2); w(2)=CS4/(2*CS6); and CSm=cos(mπ/16).

21. A computer readable medium containing executable instructions which, when executed in a processing system, causes the system to perform the steps for performing 1/4 size decoding of an encoded digital image, comprising:

applying a combined horizontal 2-point inverse weighting function and inverse discrete cosine transform to a lower quarter of an input block of coefficients IN0, IN1 to produce a second block;

applying a combined vertical 2-point inverse weighting function and inverse discrete cosine transform to a lower quarter of the second block; and applying a horizontal 2-point inverse weighting function and inverse discrete cosine transform is applied to two columns of lower frequency coefficients; and applying a horizontal 2-point inverse weighting function and inverse discrete cosine transform and applying a vertical 2-point inverse weighting function and inverse discrete cosine transform are performed according to the following equation:

$$P(x, y) = \frac{1}{4} \sum_{v=0}^{1} \left\{ \frac{C'(v)}{w(v)} \cos\frac{\pi v(2y+1)}{4} \left[ \sum_{h=0}^{1} \left( \frac{C'(h)}{w(h)} \cos\left(\frac{\pi h(2x+1)}{4}\right) \right) Q''(h, v) \right] \right\}$$

where P(x,y) represents the pixel value at location (x,y); C'(h)=1 when h=0 or √2 when h=1; Q"(h,v)=2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2), and CSm=cos(mπ/16).

22. The computer readable medium as set forth in claim 21, wherein the input block comprises and m×n matrix, where m≧2 and n≧2 and the instruction of applying a horizontal 2-point inverse weighting function and inverse discrete cosine transform is applied to two rows of lower frequency coefficients.

23. The computer readable medium as set forth in claim 21, wherein the input block comprises and m×n matrix, where m≧2 and n≧2 and the instruction of applying a horizontal 2-point inverse weighting function and inverse discrete cosine transform is applied to two columns of lower frequency coefficients.

24. The computer readable medium as set forth in claim 21, wherein the input block comprises two m×n matrices of sum and difference coefficients, where m≧2 and n≧2.

25. The computer readable medium as set forth in claim 24, wherein the instruction of applying a horizontal 2-point inverse weighting function and inverse discrete cosine transform is applied to two rows of lower frequency coefficients.

26. The computer readable medium as set forth in claim 24, wherein the instruction of applying a vertical 2-point inverse weighting function and inverse discrete cosine transform is applied to two rows of sums of sum and difference coefficients.

27. The computer readable medium as set forth in claim 24, wherein the instructions of applying a horizontal 2-point inverse weighting function and inverse discrete cosine transform, setting, applying a vertical 2-point inverse weighting function and inverse discrete cosine transform and extracting comprise the following equation:

$$P(x, y) = \frac{1}{4} \sum_{v=0}^{1} \left\{ \frac{C'(v)}{w(2v)} \cos\frac{\pi v(2y+1)}{4} \left[ \sum_{h=0}^{1} \left( \frac{C'(h)}{w(h)} \cos\left(\frac{\pi h(2x+1)}{4}\right) Q''(h, v) \right) \right] \right\}$$

where P(x,y) represents the pixel value at location (x,y); C'(h)=1 when h=0 or √2 when h=1; Q"(h,v)=2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2); w(2)=CS4/(2*CS6); and CSm=cos(mπ/16).

28. The computer readable medium as set forth in claim 24, wherein the instruction of applying a horizontal 2-point combined inverse weighting function and inverse discrete cosine transform comprises applying the following function:

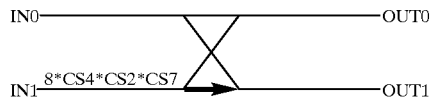

29. The computer readable medium as set forth in claim 24, wherein the instruction of applying a vertical 2-point combined inverse weighting function and inverse discrete cosine transform comprises applying the following function:

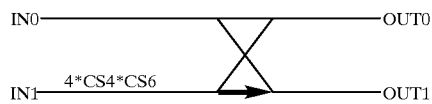

30. The computer readable medium as set forth in claim 21, wherein the instruction of applying a horizontal and vertical 2-point combined inverse weighting function and inverse discrete cosine transform each comprises applying the following function:

31. A computer readable medium containing executable instructions which, when executed in a processing system, causes the system to perform the steps for performing ¼ size decoding of an encoded digital image, comprising:
applying a combined vertical 2-point inverse weighting function and inverse discrete cosine transform to a lower quarter of an input block of coefficients to produce a second block;

applying a combined horizontal 2-point inverse weighting function and inverse discrete cosine transform to a lower quarter of the second block; and applying a horizontal 2-point inverse weighting function and inverse discrete cosine transform, setting, applying a vertical 2-point inverse weighting function and inverse discrete cosine transform and extracting comprise the following equation:

$$P(x, y) = \frac{1}{4}\sum_{h=0}^{1}\left\{\frac{C'(h)}{w(h)}\cos\frac{\pi h(2x+1)}{4}\left[\sum_{v=0}^{1}\left(\frac{C'(v)}{w(v)}\cos\left(\frac{\pi v(2y+1)}{4}\right)\right)Q''(h,v)\right]\right\}$$

where P(x,y) represents the pixel value at location (x,y); C'(h)=1 when h=0 or √2 when h=1; Q"(h,v)=2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2); and CSm=cos(mπ/16).

32. The computer readable medium as set forth in claim 31, wherein the input block is two 4×n matrices of sum and difference coefficients and the instructions of applying a horizontal 2-point inverse weighting function and inverse discrete cosine transform, setting, applying a vertical 2-point inverse weighting function and inverse discrete cosine transform and extracting comprise the following equation:

$$P(x, y) = \frac{1}{4}\sum_{h=0}^{1}\left\{\frac{C'(h)}{w(h)}\cos\frac{\pi h(2x+1)}{4}\left[\sum_{v=0}^{1}\left(\frac{C'(v)}{w(2v)}\cos\left(\frac{\pi v(2y+1)}{4}\right)\right)Q''(h,v)\right]\right\}$$

where P(x,y) represents the pixel value at location (x,y); C'(h)=1 when h=0 or √2 when h=1; Q"(h,v)=2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2); w(2)=CS4/(2*CS6); and CSm=cos(mπ/16).

* * * * *